United States Patent
Jayaraman et al.

(10) Patent No.: US 10,178,136 B2
(45) Date of Patent: Jan. 8, 2019

(54) SYSTEMS AND METHODS OF PROVIDING MULTIMEDIA SERVICE TO A LEGACY DEVICE

(71) Applicant: RELIANCE JIO INFOCOMM LIMITED, Mumbai (IN)

(72) Inventors: Shankar Jayaraman, Bangalore (IN); Akhilesh Dwivedi, Mumbai (IN); Dev Karan Nehra, Mumbai (IN); Shilpa Popat, Mumbai (IN); Rao Shreyas Sudheendra, Nerul (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 44 days.

(21) Appl. No.: 15/394,695

(22) Filed: Dec. 29, 2016

(65) Prior Publication Data
US 2017/0195372 A1    Jul. 6, 2017

(30) Foreign Application Priority Data

Dec. 30, 2015   (IN) .......................... 4970/MUM/2015

(51) Int. Cl.
*H04W 4/00*   (2018.01)
*H04L 29/06*   (2006.01)

(52) U.S. Cl.
CPC ...... *H04L 65/1073* (2013.01); *H04L 65/1016* (2013.01); *H04L 65/1059* (2013.01); *H04L 65/1096* (2013.01); *H04L 65/1033* (2013.01)

(58) Field of Classification Search
None
See application file for complete search history.

(56) References Cited

U.S. PATENT DOCUMENTS

| | | | |
|---|---|---|---|
| 2009/0190573 A1* | 7/2009 | Siegel | H04L 65/1016 370/352 |
| 2009/0191867 A1* | 7/2009 | Siegel | H04L 65/1016 455/435.1 |
| 2009/0191868 A1* | 7/2009 | Siegel | H04L 65/1016 455/435.1 |

(Continued)

*Primary Examiner* — Anh Vu H Ly
(74) *Attorney, Agent, or Firm* — Ladas & Parry, LLP

(57) ABSTRACT

Systems and methods of the present disclosure relates to providing at least one multimedia service to at least one legacy device [120]. Embodiments may encompasses a method comprising steps of, establishing a connection between at least one user equipment [110A, 110B, 110C] and the at least one legacy device [120] via an IP multimedia sub-system [150]; receiving at least one parameter of the at least one legacy device [120] at the IP multimedia sub-system [150]; authenticating at least one user equipment [110A, 110B, 110C] by the IP multimedia sub-system [150]; registering the at least one user equipment and the at least one legacy device [120] at the IP multimedia sub-system [150]; updating of the legacy device [120] with an information pertaining to the registration of the at least one user equipment [110A, 110B, 110C]; and providing at least one multimedia service to the at least one legacy device [120] via the IP multimedia sub-system [150].

9 Claims, 7 Drawing Sheets

(56) References Cited

U.S. PATENT DOCUMENTS

| | | | | |
|---|---|---|---|---|
| 2009/0191869 A1* | 7/2009 | Siegel | .................... | H04W 8/02 |
| | | | | 455/435.1 |
| 2009/0191870 A1* | 7/2009 | Siegel | ................ | H04L 65/1016 |
| | | | | 455/435.1 |
| 2009/0191871 A1* | 7/2009 | Siegel | .................. | H04W 12/06 |
| | | | | 455/435.1 |
| 2009/0191873 A1* | 7/2009 | Siegel | ................ | H04L 29/1216 |
| | | | | 455/435.2 |

* cited by examiner

SYSTEMS AND METHODS OF PROVIDING MULTIMEDIA SERVICE TO A LEGACY DEVICE

CROSS REFERENCE TO RELATED APPLICATIONS

This application claims the benefit of and priority to Indian Patent Application No. 4970/MUM/2015 filed on Dec. 30, 2015, the disclosure of which is hereby incorporated herein by reference.

TECHNICAL FIELD

Embodiments of the present disclosure generally relates to communication systems. More particularly, embodiments of the present disclosure relate to establishing and providing multimedia service to non-compatible devices.

BACKGROUND

As we talk about preceding generation of telecommunication systems, the conventional telephone service/Public switched telephone network (POTS/PSTN) is a voice-grade telephone service that employs analog signal transmission over copper loops for providing the standard service from service providers with the Integrated Services Digital Network (ISDN) and Basic Rate Interface (BRI) technologies. The POTS were followed by cellular telephone systems and Voice over IP (VoIP) in the current scenario; however, the POTS remained as a basic form of communication for most of the residential and business service connections to the telephone network across the world.

However, with the augmentation of wireless technologies such as GMS, EDGE, HSPA, and LTE, where all the communications over a wireless network provides plentiful of services such as voice, video, data, advertisement, content, messaging, and broadcasts. The services usually have multiple access networks, support communications for multiple users by sharing the available network resources. One example of such a network is the Evolved Universal Terrestrial Radio Access (E-UTRA) which is a radio access network standard, meant to be a replacement of the UMTS and HSDPA/HSUPA technologies specified in 3GPP releases 5 and later versions. On the other hand, the technologies such as HSPA, LTEts E-UTRA is an entirely new air interface system, unrelated to and incompatible with W-CDMA which provides higher data rates, lower latency and is optimized for packet data. The UMTS is the successor to the GSM technology which currently supports various air interface standards, such as Wideband-Code Division Multiple Access (W-CDMA), Time Division-Code Division Multiple Access (TD-CDMA), and Time Division-Synchronous Code Division Multiple Access TD-SCDMA).

Further, a home gateway which is a part of carrier network, with an IMS gateway has been used as a terminal device for connecting customer premises to a broadband delivery network by telecommunication's Multiple Service Operators (MSOs). The home gateway further supports remote control, detection and configuration capabilities at the carrier network. The Home Gateway is also acknowledged to provide Wi-Fi services and fixed line services (FLN) for analog POTS devices. Currently, the FLN provided over the home gateway is known to have only backend circuit switch network.

As the IMS network is booming in the communications fraternity and the features like rich communication services (RCS) being abundantly used, the existing technology restricts the user to merely utilize only calling feature provided by the POTS phone. Therefore, an inability to allow extended IP Multimedia IPMM/RCS services on such non-compatible devices is a major drawback in the existing arts.

Currently, there is no foreseeable solution that exists on the IMS home gateway architecture to bind/couple with the non-compatible devices which allow non-compatible devices to not only have mobility features but also benefit the non-compatible devices with multimedia services such as IPMM services and/or RCS. Accordingly, there is a need in the art to provide a unique mechanism to bind/couple a non-compatible device with the IMS home gateway thereby overcoming the drawbacks inherent in the existing arts. Further, there is a need to provide a system and mechanism to allow a user with the non-compatible device to avail the multimedia services.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may provide a system for providing at least one multimedia service to at least one legacy device [120], the system [100] comprising: at least one user equipment [110A, 110B, 110C] capable of using at least one multimedia service; an IP Multimedia sub-system [150] connected to the at least one legacy device [120] and the at least one user equipment [110A, 110B, 110C]. The connection is established between the IP multimedia sub-system [150] and the at least one user equipment [110A, 110B, 110C] by allocating an IP address to the at least one user equipment [110A, 110B, 110C] by the IP multimedia sub-system [150]. Further, the at least one user equipment [110A, 110B, 110C] is authenticated by the IP multimedia sub-system [150], in response to a request generated by the at least one user equipment [110A, 110B, 110C], the authentication being based on at least one parameter of the at least one user equipment [110A, 110B, 110C]. Furthermore, the at least one user equipment [110A, 110B, 110C] gets registered at the IP multimedia sub-system [150] in response to a request generated by the at least one user equipment [110A, 110B, 110C], the registration being based on at least one of a unique ID of the at least one user equipment [110A, 110B, 110C] and a signature information of the at least one legacy device [120]. The at least one multimedia service is provided to the at least one legacy device [120] via the IP multimedia sub-system [150].

Further, the embodiments of the present disclosure encompass a method [200] for providing at least one multimedia service to at least one legacy device [120], the method comprising: establishing a connection between at least one user equipment [110A, 110B, 110C] and the at least one legacy device [120] via an IP multimedia sub-system [150]; receiving at least one parameter of the at least one legacy device [120] at the IP multimedia sub-system [150]; authenticating at least one user equipment [110A, 110B, 110C] by the IP multimedia sub-system [150] in response to an authentication request generated by said at least one user equipment [110A, 110B, 110C]; registering the at least one user equipment [110A, 110B, 110C] and the at least one legacy device [120] at the IP multimedia sub-system [150] in response to a corresponding request generated by the at least one user equipment [110A, 110B, 110C] and the at least one legacy device [120]; updating of the legacy device [120] with an information pertaining to the registration of the at least one user equipment [110A, 110B, 110C] upon registration of the at least user equipment [110A, 110B, 110C] at the IP multimedia; and providing at least one multimedia service to the at least one legacy device [120] via the IP multimedia sub-system [150]. Further, an IP address is allocated to the at least one user equipment [110A, 110B, 110C] by the IP multimedia sub-system [150]. The authentication is based on at least one parameter of the at least one user equipment [110A, 110B, 110C]. Moreover, the registration of the at least one user equipment [110A, 110B, 110C] and the at least one legacy device [120] is based on corresponding at least one of the at least one parameter and a signature information.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
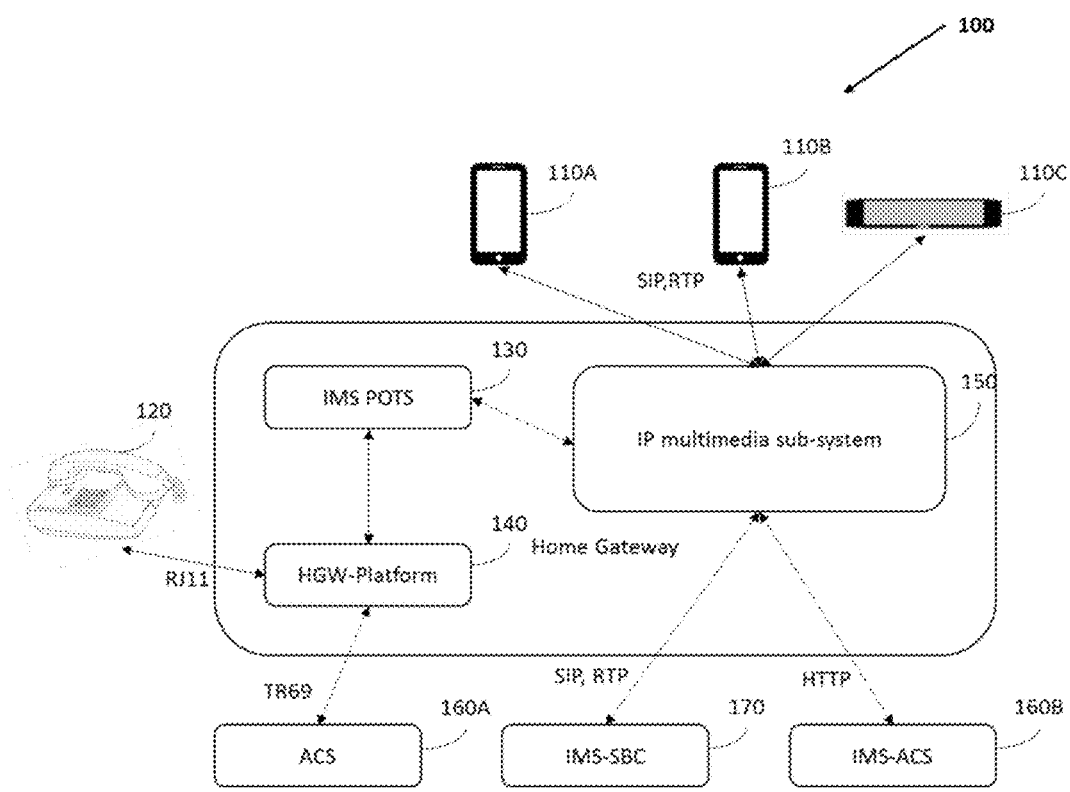
FIG. 1 illustrates a simplified system architecture in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure provide systems and methods for binding/coupling a non-compatible device (hereinafter referred to as legacy device [120]) on the IMS home gateway architecture (hereinafter referred to as IP multimedia sub-system [150]) to enable the IPMM/RCS services (hereinafter referred to as multimedia services) through an interface.

Further, embodiment relates to a method and system that enables the legacy device [120] to couple through the IP multimedia sub-system [150] to realize the device configuration, credentials, allowed Ext. list and other details from a configuration server [160A, 160B] in a network (HGW-ACS), wherein the realization may be provided through protocols such as, but not limited to, TR69, HTTP/HTTPS, socket, TFTP, SNMP, and the IMS-GW component which interfaces with a PSTN IMS network for receiving the multimedia services seamlessly.

Further, the methods and systems allow the legacy device [120] to seamlessly avail the multimedia services via the IP multimedia sub-system [150] which, in an embodiment, may be initiated from a user equipment [110A, 110B, 110C], wherein the user equipment [110A, 110B, 110C] is an IP enabled device for consuming/using the multimedia contents/services.

The user equipment [110A, 110B, 110C] may include, but are not limited to, a mobile phone, a tablet, a phablet, a laptop, a desktop computer, a personal digital assistant (PDAs), a set top box and devices obvious to a person skilled in the art. Further, the user equipment [110A, 110B, 110C] may comprise an input means such as a keyboard, an operating system, a memory unit, a display interface, etc. On the other hand, the legacy device [120] is a Plain Old Telephone Service (POTS) which is initially not compatible to receive multimedia services, the legacy device [120] may include, but not limited to, land phone, etc.

FIG. 1 illustrates an exemplary embodiment of the present disclosure which encompasses a system for providing at least one multimedia service to at least one legacy device [120], the system [100] comprising: at least one user equipment [110A, 110B, 110C] capable of using at least one multimedia service; an IP Multimedia sub-system [150] connected to the at least one legacy device [120] and the at least one user equipment [110A, 110B, 110C]. The connection is established between the IP multimedia sub-system [150] and the at least one user equipment [110A, 110B, 110C] by allocating an IP address to the at least one user equipment [110A, 110B, 110C] by the IP multimedia sub-system [150]. In one embodiment, the at least one legacy device [120] is coupled to the IP multimedia sub-system [150] through an interface such as RJ11.

Further, the at least one user equipment [110A, 110B, 110C] is authenticated by the IP multimedia sub-system [150], in response to a request generated by the at least one user equipment [110A, 110B, 110C], the authentication being based on at least one parameter of the at least one user equipment [110A, 110B, 110C]. Furthermore, the at least one user equipment [110A, 110B, 110C] gets registered at the IP multimedia sub-system [150] in response to a request generated by the at least one user equipment [110A, 110B, 110C], the registration being based on at least one of a unique ID of the at least one user equipment [110A, 110B, 110C] and a signature information of the at least one legacy device [120]. The at least one multimedia service is provided to the at least one legacy device [120] via the IP multimedia sub-system [150].

The at least one parameters as used herein may include, but not limited to, unique identifiers such as MAC-ID, IMEI (International Mobile Equipment Identity) and UUID (universally unique identifier), serial number.

The signature information as used herein may include, but not limited to, SIP parameters such as IMPU (IP Multimedia Public Identity), IMPI (IP Multimedia Private Identity), Home domain name, SIP Digest Username and SIP Password.

Further, in accordance with an exemplary embodiment of the present disclosure, the at least one legacy device [120] is connected to a home gateway architecture through the IP multimedia sub-system [150] that utilizes IMS technology to realize multimedia services such as IPMM and/or RCS. The Home-gateway fetches the device configuration, credentials, allowed extension list and other details from the configuration server [160A, 160B] in the network (HGW-ACS) through protocols such as, but not limited to, TR69, HTTP/HTTPS, socket, TFTP, SNMP, on a FTTx to configure the legacy device [120] such as POTS in a wireless heterogeneous network. Further, the home-gateway has an IMS-GW component that interfaces with the PSTN IMS network for telephony.

Additionally, the user equipment [110A, 110B, 110C] with the multimedia capability may initiate calls using an application level protocol by using credentials of the legacy device [120]. The IMS-GW realizes connectivity with the legacy device [120] through SLIC interface on RJ11 for telephone signaling and audio services. The device ID (i.e. Mac-ID) user equipment [110A, 110B, 110C] with application level protocols is pre-provisioned in the configuration server [160A, 160B] to allow the service to work. The provisioning on the configuration server [160A, 160B] happens as a part of user equipment [110A, 110B, 110C] with application level protocols being downloaded and involves user consent during the setting up process. Further, the IMS-GW registers for voice service on behalf of the legacy device [120] when it boots up and waits for additional connections from another user equipment [110A, 110B, 110C].

Figure 2:
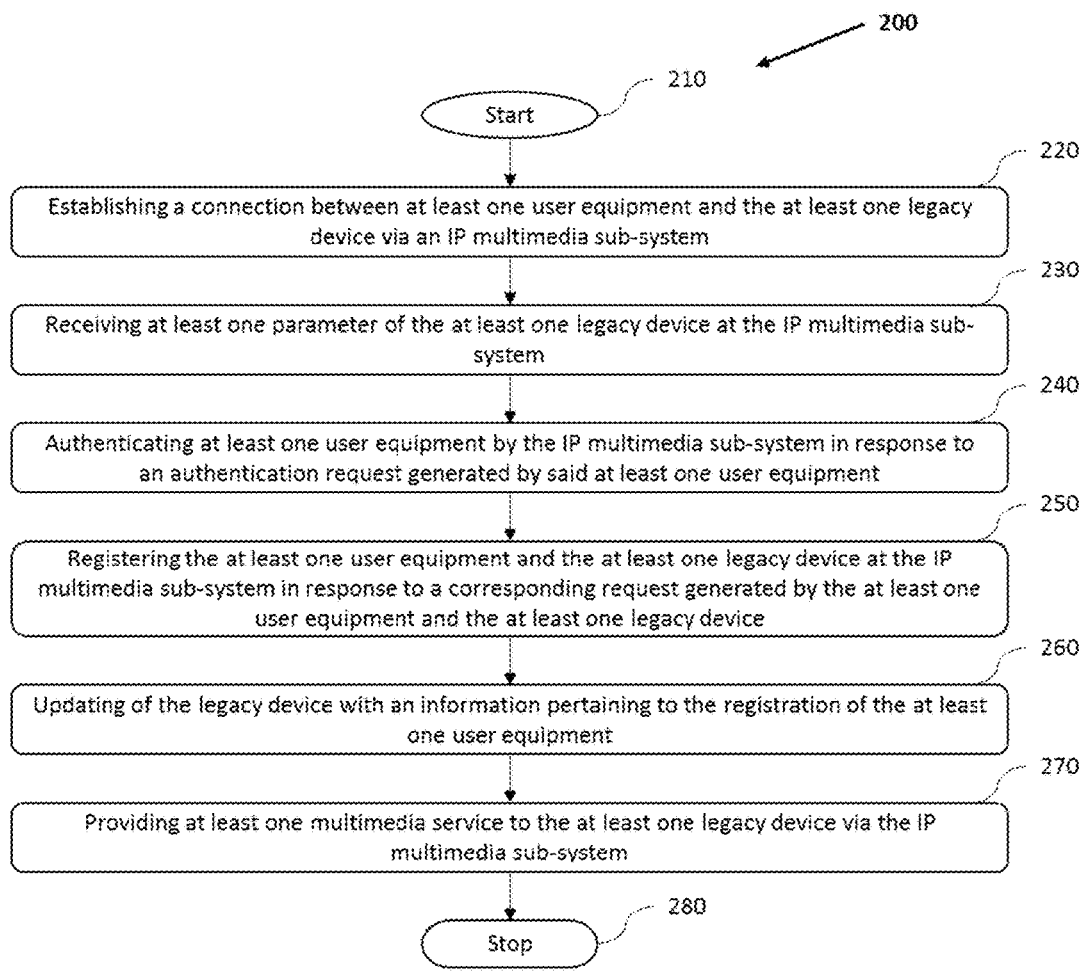
FIG. 2 illustrates an exemplary method flow diagram in one embodiment of the present disclosure.

As illustrated in FIG. 2, the present disclosure encompasses a method [200] for providing at least one multimedia service to at least one legacy device [120]. The following includes detailed steps involved in proving the at least one multimedia service to the at least one legacy device [120], wherein the process step initiates at step 210.

At step 220, a connection is established between at least one user equipment [110A, 110B, 110C] and the at least one legacy device [120] via an IP multimedia sub-system [150]. Further, the at least one user equipment [110A, 110B, 110C] is allocated with an IP address by the IP multimedia sub-system [150].

At step 230, the at least one parameter of the at least one legacy device [120] is received at the IP multimedia sub-system [150].

At step 240, the at least one user equipment [110A, 110B, 110C] is authenticated by the IP multimedia sub-system [150] in response to an authentication request generated by said at least one user equipment [110A, 110B, 110C]. Further, the authentication is based on at least one parameter of the at least one user equipment [110A, 110B, 110C].

At step 250, the at least one user equipment [110A, 110B, 110C] and the at least one legacy device [120] is registered at the IP multimedia sub-system [150] in response to a corresponding request generated by the at least one user equipment [110A, 110B, 110C] and the at least one legacy device [120]. Further, the registration of the at least one user equipment [110A, 110B, 110C] and the at least one legacy device [120] is based on corresponding at least one of the at least one parameter and a signature information.

At step 260, the legacy device [120] is updated with an information pertaining to the registration of the at least one user equipment [110A, 110B, 110C] upon registration of the at least user equipment [110A, 110B, 110C] at the IP multimedia.

At step 270, the at least one multimedia service is provided to the at least one legacy device [120] via the IP multimedia sub-system [150]. Whereas, the process terminates at step 280.

Figure 3:
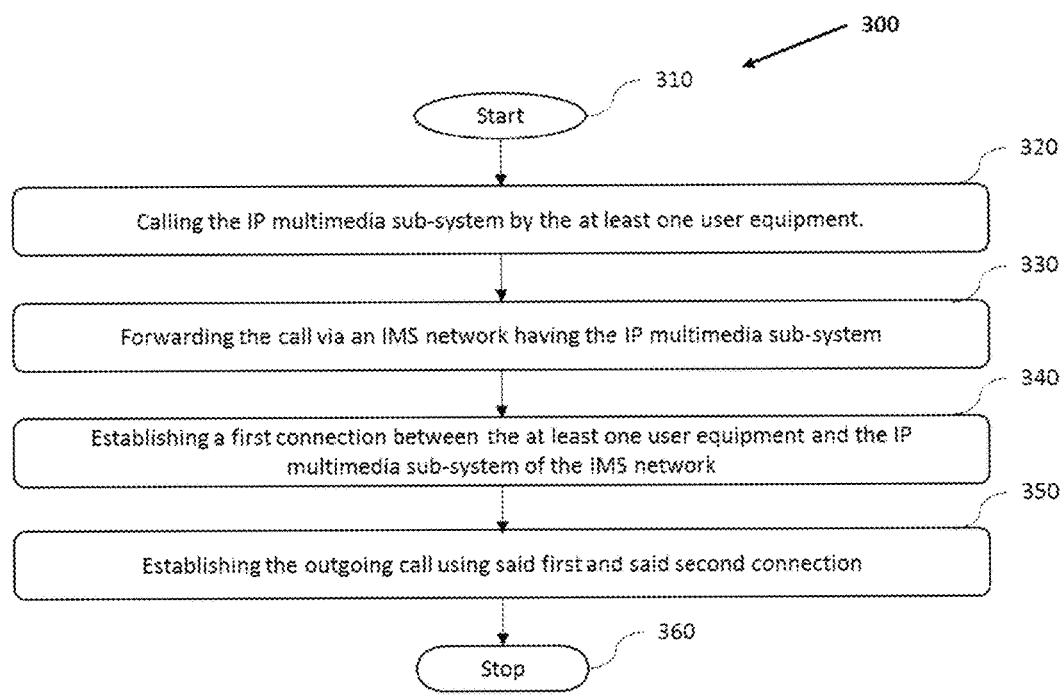
FIG. 3 illustrates an exemplary method flow diagram for initiating an outgoing call with an embodiment of the present disclosure.

As illustrated in FIG. 3, the present disclosure encompasses a method [300] for making an outgoing call in accordance with an embodiment. The method [300] process initiates at step 310.

At step 320, the IP multimedia sub-system [150] is called by the at least one user equipment [110A, 110B, 110C], wherein the call is established based on the signature information of the at least one legacy device [120] and the unique ID of the at least one user equipment [110A, 110B, 110C].

At step 330, the call is forwarded to the IP multimedia sub-system [150] via an IMS network based on authentication of the at least one user equipment [110A, 110B, 110C].

At step 340, a first connection is established between the at least one user equipment [110A, 110B, 110C] and the IP multimedia sub-system [150] of the IMS network.

At step 350, the outgoing call is established using said first and said second connection. Further, the at least one user equipment [110A, 110B, 110C] uses the signature information of the at least one legacy device [120] to make the outgoing call. The process terminates at step 360.

Figure 4:
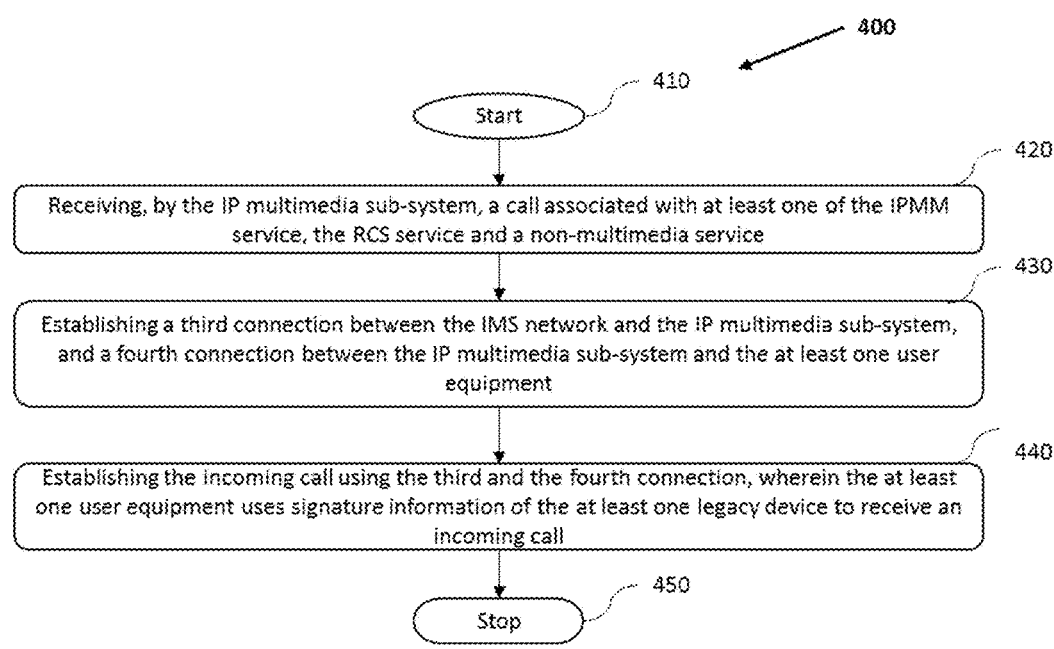
FIG. 4 illustrates an exemplary method flow diagram for initiating an incoming call with an embodiment of the present disclosure.

As illustrated in FIG. 4, the present disclosure encompasses a method [400] for receiving an incoming call in accordance with an embodiment. The method [400] process initiates at step 410.

At step 420, a call associated with at least one of the IPMM service, the RCS service and a non-multimedia service is received by the IP multimedia sub-system [150].

At step 430, a third connection between the IMS network and the IP multimedia sub-system [150] is established. Subsequently, the incoming call may be segregated to all of the connected devices by the IP multimedia sub-system [150]. A fourth connection between the IP multimedia sub-system [150] and the user equipment [110A, 110B, 110C] is established based on the user configuration of the user equipment [110A, 110B, 110C].

At step 440, the user equipment [110A, 110B, 110C] may accept the incoming call, wherein the connection for the incoming call is maintained using connections including the third and the fourth connections but not limited to any other connections from IP multimedia subsystem [150] to the user equipment [110A, 110B, 110C] are terminated. The process [400] terminates at step 450. Further, the connection may be extended to multiple user equipment [110A, 110B, 110C] in which the IP multimedia subsystem [150] ensures routing of voice packets transmitted during this course.

In yet another embodiment, the present disclosure encompasses the legacy device [120] to be provisioned and connected to the IMS network through the IP multimedia sub-system [150] that utilizes IMS technology to realize the multimedia services such as the IPMM/RCS services, the detailed steps performed are mentioned herein below:

1. A user would be assigned with a PSTN (Public Switched Telephone Number) number (Fixed Line Number-FLN) which may be based on the location of the user.
2. The ISO elements would get provisioned with the required information for providing the IPMM/RCS services along with FTTx.
3. The IPMM/RCS services related required data should be provisioned in CNUM, CRM and Charging System.
4. The ISO may also generate SIP-Digest key for FLN and provision FLN, SIP-Digest, Domain Name and Number of allowed user equipment [110A, 110B, 110C], the serial number of the home Gateway in ACS.
5. The ISO may also provision FLN, and FQDN of the IMS-ACS [160B] as additional parameters for the Home Gateway to the Devices-ACS[160A].
6. The ISO may also provision FLN, SIP-Digest, and Domain Name to the HSS (Network element).
7. The FTTx work order is completed and all the necessary devices are installed at the premise of the user.

Figure 5:
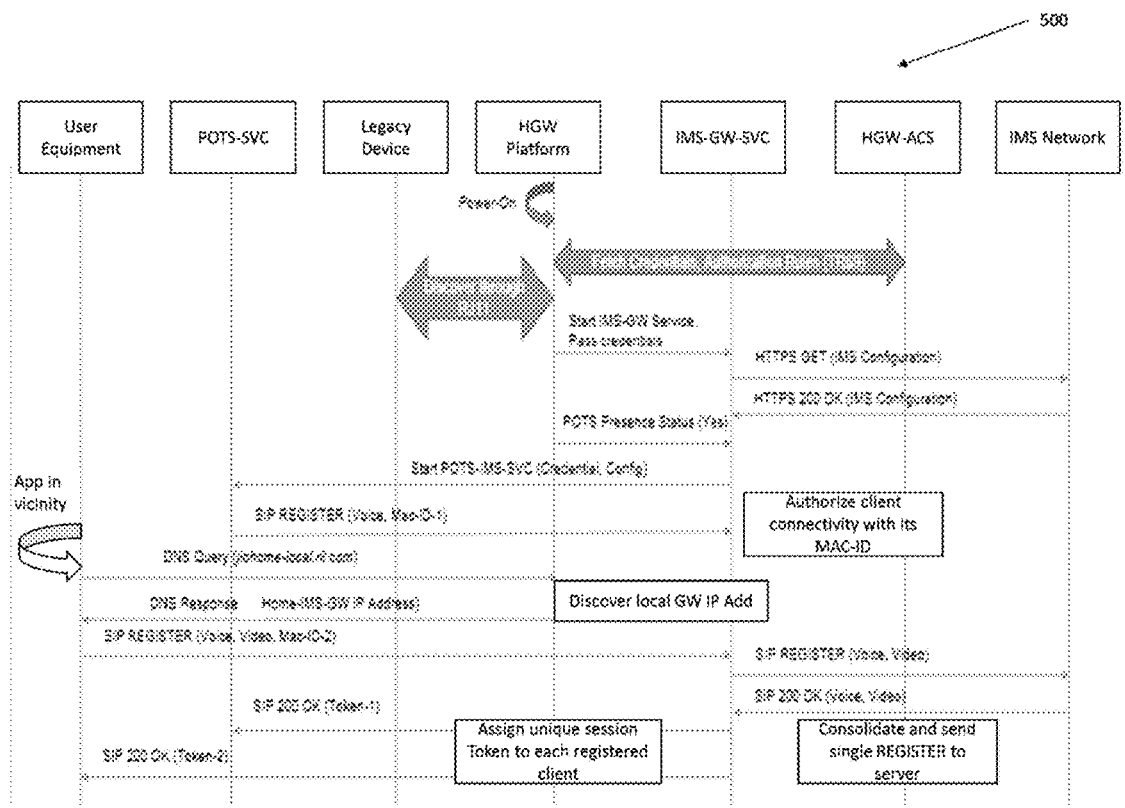
FIG. 5 illustrates an exemplary signaling flow diagram of the binding/registration through the user equipment [110A, 110B, 110C].

FIG. 5 illustrates an exemplary embodiment of the present disclosure that encompasses a mechanism/method [500] of coupling/pairing the legacy device [120] such as POTS on the network through a home gateway having IP multimedia sub-system [150] that utilizes IMS technology to realize the device configuration, credentials, allowed Ext-List and other details from the configuration server [160A, 160B] in the network (HGW-ACS) through protocols such as TR69, but not limited to, TR69, HTTP/HTTPS, socket, TFTP, SNMP, and the IMS-GW component which interfaces with the PSTN IMS network for receiving the IPMM/RCS services, seamlessly.

The following steps depict the binding/registration/coupling of the legacy device [120] with the user equipment [110A, 110B, 110C] via IP multimedia sub-system [150]:

As a first step, as soon as the HGW boots up, the IP multimedia subsystem [150] learns the Fixed Line Number and the IMS Auto Configuration Server [160B] details from the ACS server [160A] using protocols such as TR69, but not limited to, TR69, HTTP/HTTPS, socket, TFTP, and SNMP.

As a second step, the IP multimedia subsystem [150] checks the received IMS Auto Configuration Server [160B] address to check if the same is Fully Qualified Domain Name (FQDN). Upon a positive response, the IP Multimedia Subsystem [150] resolves the address and alternatively, the IP Multimedia Subsystem [150] use the IP address to fetch the IMS configurations from IMS configuration server.

As a third step, the IP multimedia subsystem [150] using the IMS parameter received in step-2 triggers the IMS registration for multimedia services such as the IPMM/RCS services which may relate to services such as a voice and a video services with the IMS-Network.

As a fourth step, the user equipment [110A, 110B, 110C] on identifying that it is in the vicinity of the HGW (by recognizing the Wi-Fi SSID of the HGW), tries to resolve the preconfigured domain name of HGW. If it resolves at the HGW, the application level protocol at user equipment [110a, 11b, 110c] realizes the HGW support the IP multimedia subsystem [150].

As a fifth step, to the resolved IP address, the application level protocol triggers a configuration command fetch from the IMS-GW server, wherein the IMS-GW server first authenticates the request by validating the MAC-ID of the originating device. In an event, the device is authenticated, all the client configurations, including the legacy device [120] credentials except IMS-SBC and instead of IMS-SBC will send self IP address to the user equipment [110A, 110B, 110C] along with a unique token IMS-GW server. This unique token is used by the user equipment [110A, 110B, 110C] for all further communications with the IMS-GW.

As a sixth step, using the credentials, the user equipment [110A, 110B, 110C] triggers the IMS registration for multimedia services such as the IPMM/RCS services which can be related to a voice and a video services with the IMS-GW.

As a seventh step, the IMS-GW validates the request with the passed token, and confirms registration and binding/coupling. Further, in case the services that the user equipment [110A, 110B, 110C] registers have any additional features to what was already registered then the IMS-GW re-registers and binds/couples again with the IMS network along with the additional service details.

Figure 6:
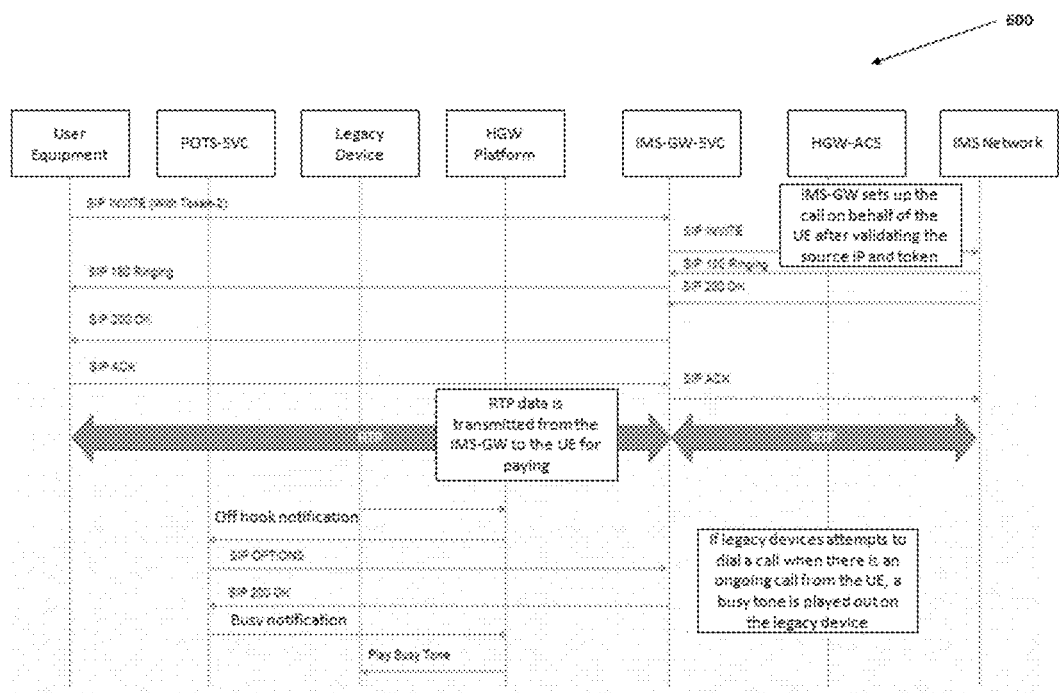
FIG. 6 illustrates an exemplary signaling flow diagram of call flow when dialing from the user equipment [110A, 110B, 110C] with the binding/registration/coupling.

FIG. 6 illustrates an exemplary embodiment of the present disclosure that encompasses a method [600] of call flow when dialing from the user equipment [110A, 110B, 110C]. The process involves following stages implemented to enable the dialing from the user equipment [110A, 110B, 110C] with the binding/coupling system tending towards completion. The following steps mentioned below describe the implementation architecture details of the call flow:

At step 1, the user equipment [110A, 110B, 110C] initiates the call and sends an INVITE to the IMS-GW with a unique token.

At step 2, the IMS-GW forwards the received INVITE to the IMS network after authenticating the originating UE's token.

At step 3, in the forwarded INVITE, the IMS-GW modifies the SDP and the other SIP headers to point to itself as the entity handling media and SIP traffic with the network.

At step 4, the remote party will see the landline number of the originating user as the caller-ID.

At step 5, once the signaling is completed, a media pipeline is established between the IMS core network and the IMS-GW. The IMS-GW sets up a similar RTP media pipeline between itself and the user equipment [110A, 110B, 110C] by appropriately setting the right IP address and port in the 200 OK response to the user equipment [110A, 110B, 110C].

At step 6, the IMS-GW gets RTP packets from the user equipment [110A, 110B, 110C], modifies the header alone and sends it to the IMS core network. Similarly, it receives RTP packets from the IMS network, modifies the header alone and sends the packet to the user equipment [110A, 110B, 110C]. As a result, the user equipment [110A, 110B, 110C] is able to establish calls using the POTS/PSTN/landline's credentials and realize seamless telephony service.

Figure 7:
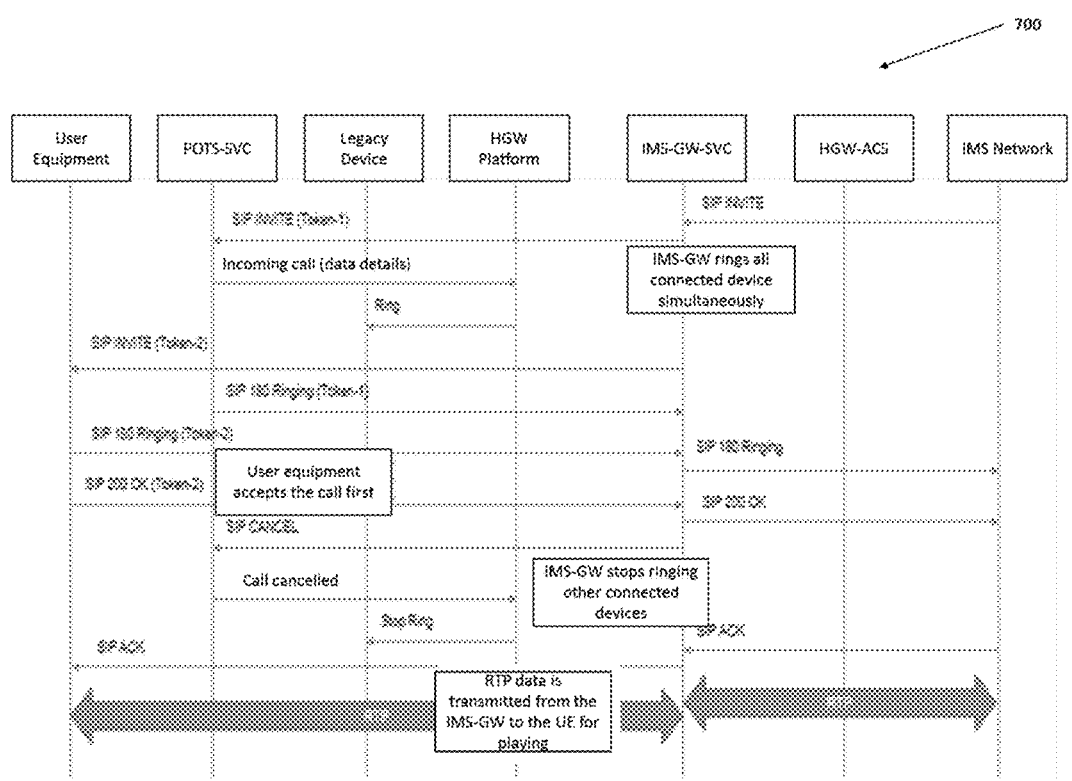
FIG. 7 illustrates an exemplary signaling flow diagram of call termination from the user equipment [110A, 110B, 110C].

FIG. 7 illustrates an exemplary embodiment of the present disclosure that encompasses a method [700] flow signaling diagram of the call termination from the user equipment [110A, 110B, 110C]. The following steps mentioned below describe the implementation architecture details of the call flow:

At step 1, the IMS-GW receives the incoming call INVITE along with details of the service for which the call has been originated.

At step 2, the IMS-GW checks the registered list of extensions, matches the supported services by each extension and rings all associated devices.

At step 3, the forwarded INVITE by the IMS-GW has the SDP and SIP headers modified appropriately to point to itself as the entity handling media and SIP traffic with the network.

At step 4, the user equipment [110A, 110B, 110C] may show the credentials of the caller stored in its contact list, including photograph and other details, thereby enriching the user experience.

At step 5, the IMS-GW is able to ring the connected devices (user equipment [110A, 110B, 110C] or POTS device) simultaneously or sequentially. Provided, If it's the latter, the IMS-GW rings each device for 10 seconds before moving to the next one.

If its simultaneous ring, the user equipment [110A, 110B, 110C] may only vibrate and not ring. This is to ensure that all connected extensions at home don't start ringing simultaneously and create a poor user experience.

At step 6, the user equipment [110A, 110B, 110C] may be configured with a special ring tone to differentiate it from the user equipment [110A, 110B, 110C]'s caller default tone.

At step 7, if the user answers the call from the user equipment [110A, 110B, 110C], the HGW forwards the call answer to the network and cancels the INVITE to the other extensions and legacy device [120]. The user has an additional ability to handle video calls on the user equipment [110A, 110B, 110C].

At step 8, if the user answers the call from the legacy device [120], the HGW forwards the call answer to the network and cancels the INVITE to another user equipment [110A, 110B, 110C]. Further, the call will be answered as voice call by default in this case.

At step 9, upon completion of the signaling, a media pipeline is established between the IMS core network and the IMS-GW. The IMS-GW sets up a similar RTP media pipeline between itself and the user equipment [110A, 110B, 110C] by appropriately setting the right IP address and port in the 200 OK response to the user equipment [110A, 110B, 110C].

At step 10, the IMS-GW gets RTP packets from the user equipment [110A, 110B, 110C], modifies the header alone and sends it to the IMS core network. Similarly, it receives RTP packets from the IMS core network, modifies the header alone and sends the packet to the user equipment [110A, 110B, 110C].

At step 11, if the call is active on the legacy device [120], and the user tries to dial another call from the user equipment [110A, 110B, 110C], a busy tone will be played by the IMS-GW on the latter.

At step 12, if the call is active on the user equipment [110A, 110B, 110C] and the user tries to dial another call from the legacy device [120], a busy tone will be played on the legacy device [120] when it goes off-hook.

Though a limited number of the IP multimedia sub-system [150], the user equipment [110A, 110B, 110C], the legacy device [120], the IMS network and the link/connection/interfaces, have been shown in the figures; however, it will be appreciated by those skilled in the art that the system [100] of the present disclosure encompasses any number and varied types of the entities/elements such as the interfaces, the user equipment [110A, 110B, 110C], the legacy device [120] and the IP multimedia sub-system [150].

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

What is claimed is:

1. A method for providing at least one multimedia service to at least one legacy device, the method comprising:
   establishing a connection between at least one user equipment and the at least one legacy device via an IP multimedia sub-system, wherein an IP address is allocated to the at least one user equipment by the IP multimedia sub-system;
   receiving at least one parameter of the at least one legacy device at the IP multimedia sub-system;
   authenticating at least one user equipment by the IP multimedia sub-system in response to an authentication request generated by said at least one user equipment, wherein the authentication is based on at least one parameter of the at least one user equipment;
   transmitting a signature information of the at least one legacy device to the at least one user equipment upon authentication, wherein the signature information includes at least one of a configuration data and a credential data of the at least one legacy device;
   registering the at least one user equipment and the at least one legacy device at the IP multimedia sub-system in response to a corresponding request generated by the at least one user equipment and the at least one legacy device, wherein the registration of the at least one user equipment and the at least one legacy device is based on corresponding at least one of the at least one parameter and the signature information;
   updating of the legacy device with an information pertaining to the registration of the at least one user equipment upon registration of the at least user equipment at the IP multimedia; and
   providing the at least one multimedia service to the at least one legacy device via the IP multimedia sub-system.

2. The method as claimed in claim 1, wherein the at least one multimedia service is at least one of an IP Multimedia Services and a Rich Communication Service (RCS).

3. The method as claimed in claim 1, wherein the at least one legacy device is non-compatible to receive the at least one multimedia service, directly.

4. The method as claimed in claim 1, wherein the at least one parameter comprises at least one of a media access control ID (Mac-ID), a serial number, an international mobile equipment identity (IMEI) number and a universally unique identifier (UUID).

5. The method as claimed in claim 1, wherein the at least one multimedia service comprises at least one of an outgoing call and an incoming call.

6. The method as claimed in claim 5, wherein the outgoing call comprises:
   calling the IP multimedia sub-system by the at least one user equipment using the signature information of the at least one legacy device and the unique ID of the at least one user equipment;
   forwarding the call via an IMS network having the IP multimedia subsystem, based on authentication of the at least one user equipment;
   establishing a first connection between the at least one user equipment and the IP multimedia sub-system of the IMS network, wherein a second connection exists between the IP multimedia sub-system and the IMS network; and
   establishing the outgoing call using said first and said second connection, wherein the at least one user equipment uses the signature information of the at least one legacy device to make the outgoing call.

7. The method as claimed in claim 6, wherein the incoming call is performed by:
   receiving, by the IP multimedia sub-system, a call associated with at least one of an IPMM service, the RCS service and a non-multimedia service;
   establishing a third connection between the IMS network and the IP multimedia sub-system, and a fourth connection between the IP multimedia sub-system and the at least one user equipment; and
   establishing the incoming call using the third and the fourth connection, wherein the at least one user equipment uses the signature information of the at least one legacy device to receive an incoming call.

8. A system for providing at least one multimedia service to at least one legacy device, the system comprising:
   at least one user equipment capable of using the at least one multimedia service;
   an IP Multimedia sub-system connected to the at least one legacy device and the at least one user equipment, wherein
      a connection is established between the IP multimedia sub-system and the at least one user equipment by allocating an IP address to the at least one user equipment by the IP multimedia sub-system,
      the at least one user equipment is authenticated by the IP multimedia sub-system, in response to a request generated by the at least one user equipment, the authentication being based on at least one parameter of the at least one user equipment,
      a signature information of the at least one legacy device is transmitted to the at least one user equipment, wherein the signature information includes at least one of a configuration data and a credential data of the at least one legacy device;
      the at least one user equipment gets registered at the IP multimedia sub-system in response to a request generated by the at least one user equipment, the registration being based on at corresponding at least one of at least one parameter and the signature information of the at least one legacy device, and
      the at least one multimedia service is provided to the at least one legacy device via the IP multimedia sub-system.

9. The system as claimed in claim 8, further comprising at least one extension device connected to the IP multimedia sub-system wherein, the at least one extension device is capable of receiving and terminating one of an incoming and an outgoing call.

\* \* \* \* \*